(12) United States Patent
Gao et al.

(10) Patent No.: US 6,394,234 B1
(45) Date of Patent: May 28, 2002

(54) LIQUID CONTROLLED DISK BRAKING DEVICE

(75) Inventors: Xiangqian Gao; Enqian Zhan; Heng Su; Fenrong Cheng, all of Beijing (CN)

(73) Assignee: PetroChina Company Limited, Beijing (CN)

( * ) Notice: Subject to any disclaimer, the term of this patent is extended or adjusted under 35 U.S.C. 154(b) by 0 days.

(21) Appl. No.: 09/692,611

(22) Filed: Oct. 19, 2000

(30) Foreign Application Priority Data

Oct. 20, 1999 (CH) ........................................ 99248563 U

(51) Int. Cl.[7] ........................................... F16D 55/228
(52) U.S. Cl. ................................. 188/72.5; 188/151 A
(58) Field of Search ............................ 188/73.31, 72.5, 188/72.4, 72.9, 83, 70 R, 70 B, 71.1, 105, 106 R, 106 F, 106 P, 151 A, 366, 367

(56) References Cited

U.S. PATENT DOCUMENTS

| 4,144,953 A | | 3/1979 | Johnson et al. | |
| 4,627,519 A | | 12/1986 | Larsen et al. | |
| 4,696,377 A | | 9/1987 | Richardson et al. | |
| 5,168,963 A | * | 12/1992 | Poncini | 188/72.5 |
| 5,921,354 A | * | 7/1999 | Evans | 188/73.2 |

* cited by examiner

*Primary Examiner*—Pam Rodriguez
(74) *Attorney, Agent, or Firm*—Jon L. Woodard; MacDonald, Illig, Jones and Britton LLP

(57) ABSTRACT

The invention relates to a liquid controlled disk braking device having a brake disk, brake caliper, and a caliper carrier. The brake disk is postionable on the roller of a main hoist and forms a brake pair together with the brake calipers. A combination of service and emergency calipers, each caliper being responsive to fluid pressure, is used to effect operational and stationary braking. Service calipers are used to apply operational braking forces against the brake disk when the disk is rotating, applying braking forces when subjected to fluid pressure. Emergency calipers are used to apply braking forces when the brake disk is stationary or when liquid pressure to the caliper has been removed or lost.

9 Claims, 3 Drawing Sheets

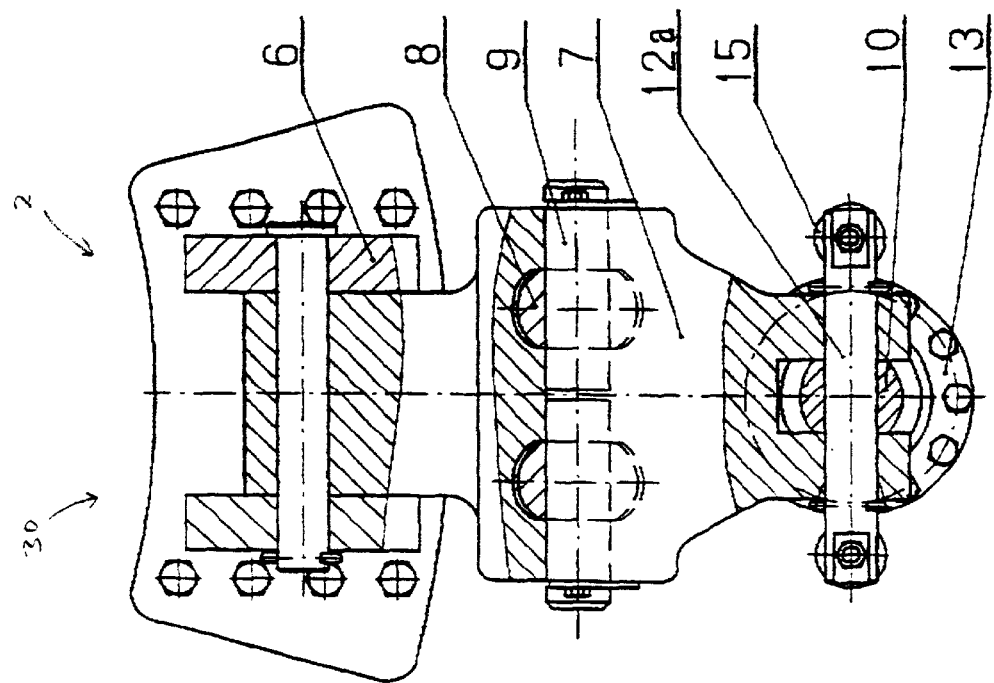
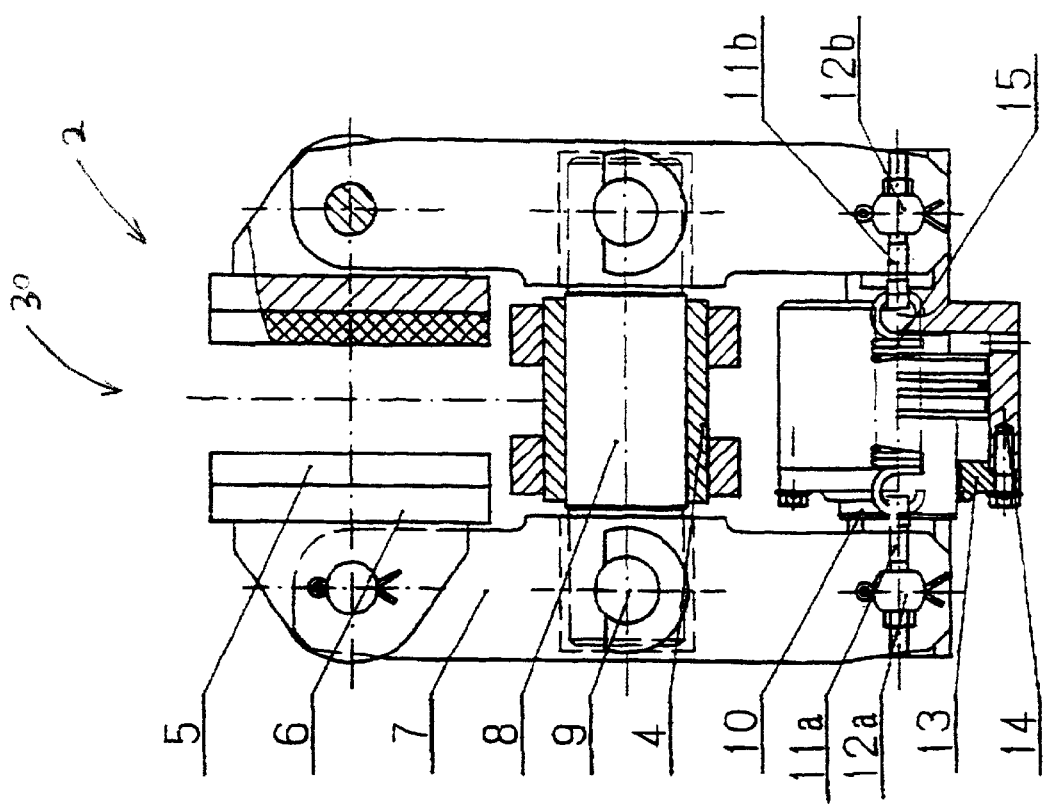
FIG. 3
FIG. 4

LIQUID CONTROLLED DISK BRAKING DEVICE

FIELD OF INVENTION

The present invention relates to an improved configuration for liquid controlled disk braking devices and is applicable to winch brakes of petrol drills, well rigs and shaft hoists, and to brake and speed controls for hoists.

BACKGROUND OF THE INVENTION

Mechanical band brakes have traditionally been used in the prior art for various applications including winch braking devices of petrol drills, well rigs, and shaft hoists. However, due to inherent design characteristics, such devices are frequently unable to provide adequate braking torque and have been plagued with problems of unreliability, unstable braking effects, heat emissions, and difficulty in operation, adjustment, and maintenance. Such limitations tend to detrimentally affect equipment life, efficiency and required operational time.

The object of the present invention is to provide a liquid controlled disk brake having the advantages of increased braking torque, braking stability, sensitivity and precision in control, quick operation, easy installation and maintenance. Also desired is a design in which automatic apparatus control may be more easily incorporated into the overall system by allowing braking to be effected by either introducing or removing fluid pressure to particular components of the apparatus.

SUMMARY OF THE INVENTION

In accordance with the present invention, a liquid controlled disk braking device comprises a brake disk, brake calipers and a caliper carrier. The brake disk is fixed to the roller of a main hoist, which forms a brake pair together with the brake calipers. The caliper carrier is arranged on a winch base to position each of the brake calipers with respect to the brake disk. The brake calipers include both operational or service calipers and emergency calipers, which vary in relative number according to the braking needs of the particular machine or application.

The service calipers are used to provide braking force when the brake disk is rotating. Each service caliper includes two brake blocks positioned on either side of the brake disk with sufficient clearance to permit the disk to rotate. An oil cylinder connected to both brake blocks forces the blocks against the disk when the cylinder is pressurized and restores clearance when pressure is removed.

The emergency calipers are used to provide braking force when the disk is parked or in an otherwise stationary position. Like the service calipers, each emergency caliper includes two brake blocks positioned on either side oft he brake disk and connected to an oil cylinder. However, unlike the service calipers, each emergency caliper's oil cylinder is configured to force the blocks against the disk when the cylinder is non-pressurized and restores clearance only when pressure is restored to the cylinder, thereby providing additional safety braking in the event of a loss of oil pressure to the system.

Features of the current invention include the ability to easily vary the amount of available total braking force by merely adapting the total number of braking clamps according to the particular needs of an application. Also included is an ability to provide additional braking force in the event of lost pressure to the braking system.

While the preferred embodiment oft his invention utilizes oil as the pressurizing fluid for the cylinder of each operational and emergency caliper, it will be appreciated that the invention contemplates other pressurizing fluids as well. The invention also contemplates other number combinations of operational and emergency calipers according the need of each particular application.

Thus, the invention does not reside in any one of the features of the liquid controlled disk braking device which is disclosed above and in the Description of the Preferred Embodiments and claimed below. Rather, this invention is distinguished from the prior art by its particular combination of features of the liquid controlled disk braking device disclosed. Important features of this invention have been disclosed in the Detailed Description of the Preferred Embodiments of this invention which are shown and described below to illustrate the best mode contemplated to date of carrying out the invention.

Those skilled in the art will realize that this invention is capable of embodiments which are different from those shown, and the details of the structure of the braking device can be changed in various manners without departing from the scope of this invention. Accordingly, the drawings and description are to be regarded as illustrative in nature and are not to restrict the scope of this invention. Thus, the claims are to be regarded as including such equivalent liquid controlled braking devices as do not depart from the spirit and scope of this invention.

BRIEF DESCRIPTION OF THE DRAWINGS

FIG. 3 is a front sectional view of the service caliper.

FIG. 4 is a side view of the service caliper depicted in FIG. 3.

DETAILED DESCRIPTION OF THE INVENTION

Figure 2:
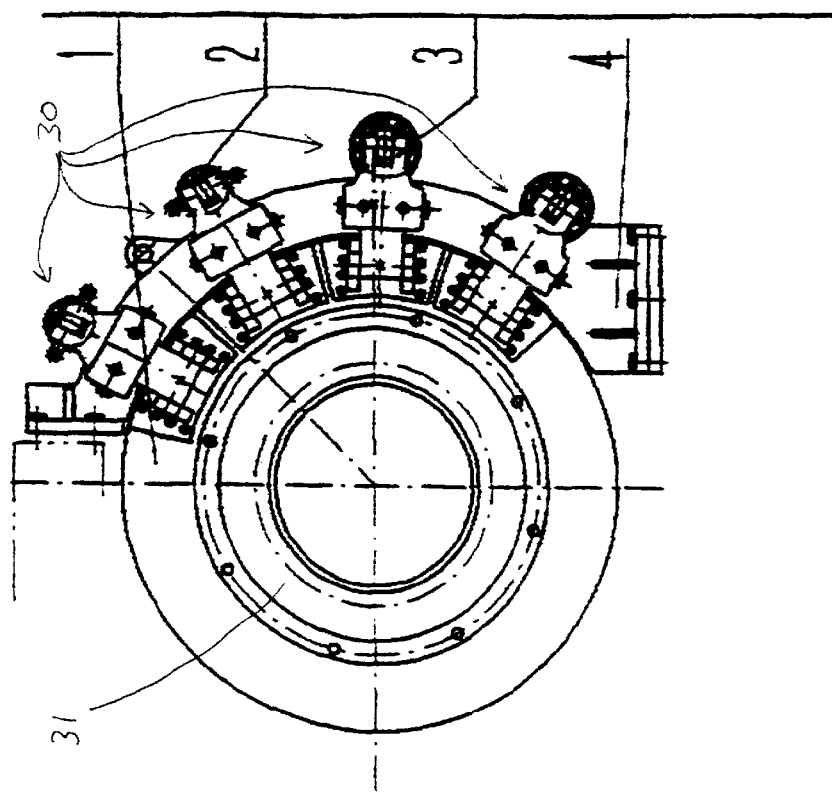
FIG. 2 is a perspective view showing the service caliper, emergency caliper, brake disk and caliper carrier that are the subject of the invention.
Figure 1:
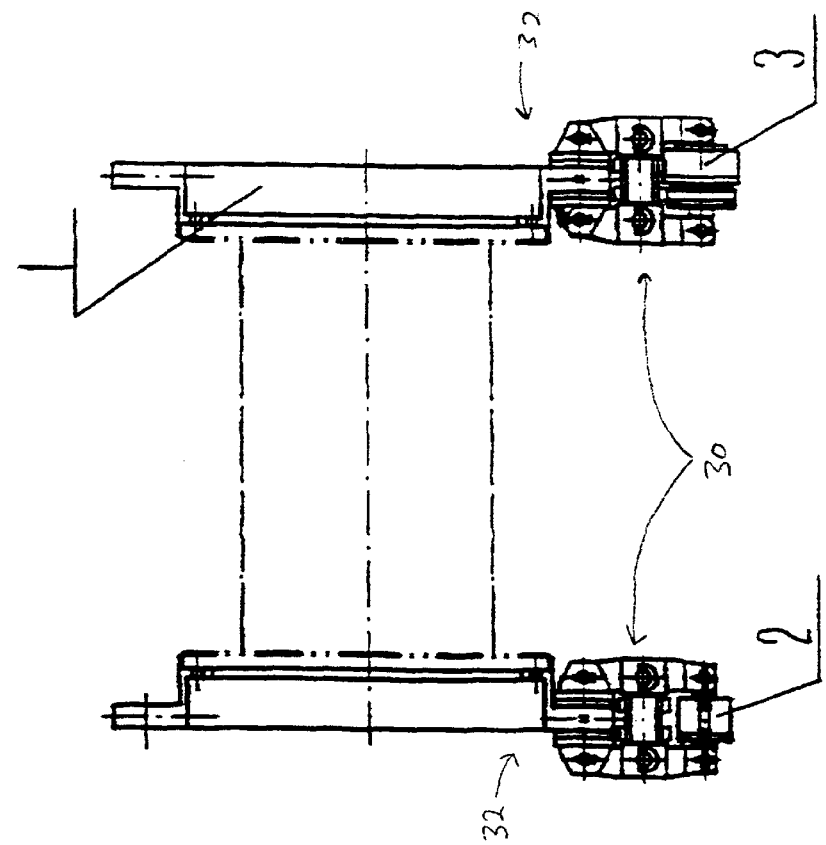
FIG. 1 is a perspective view of the present invention and the main roller.

FIGS. 1–6 generally illustrate that the liquid controlled disk braking device mainly comprises a brake disk 1, brake calipers 30 and caliper carrier 4. FIGS. 1 and 2 illustrate the substantially circular brake disk 1 fixed tightly to a main winch roller 31 which is combined with the brake calipers 30 as a brake pair 32. The caliper carrier 4 is arranged on a winch base. The brake calipers 30 are each connected to the caliper carrier 4. The brake calipers 30 include a service caliper 2 and an emergency caliper 3.

Referring now to FIGS. 3 and 4, the service caliper 3 includes brake blocks 5 positioned proximate to the two major surfaces of the brake disk 1 which is not shown in FIGS. 3 and 4. The brake blocks 5 are each fixed to caliper body 6 at one end of a lever 7. A supporting rod 8 is fixed tightly to caliper carrier 4. The two ends of supporting rod 8 cooperate smoothly with a lever notch 33 in a radial direction through shaft pin 9. The levers 7 rotate on shaft pins 9. The other ends of the two levers 7 are connected separately to a piston rod 10 through shaft pin 12*a* and to oil cylinder 14 through shaft pin 12*b*. An oil cylinder cap 13 is fixed to the oil cylinder 14. The piston rod 10 cooperates smoothly with the oil cylinder 14. Two tension springs 15 are placed parallel on the two ends of the two shaft pins 12a and 12b. One end of each tension spring 15 is joined up with spring screw 11a of shaft pin 12a connected to the piston rod 10. The other end of each tension spring 15 is connected with spring screw 11b of shaft pin 12b connected to the oil cylinder 14.

In operation, the piston rod 10 moves relative to the oil cylinder 14 to cause the brake blocks 5 to apply braking forces against the brake disk 1 under the force of the levers 7. Before the addition of pressurized oil to the oil cylinder 14, the service caliper 2 is relaxed. At this time, the brake blocks 5 are held away from the major surfaces of the brake disk 1 by tension spring 15 so that there is clearance between the blocks 5 and disk 1. Pressurized oil is then filled into the cavity of the oil cylinder 14 of the service caliper 2 via an oil inlet. A piston within the oil cylinder 14 pushes the piston rod 10 out from the oil cylinder 14 so that the piston rod 10 and cylinder 14 move relative to each other, pushing the levers 7 outward on both ends. This relative movement of the levers 7 works against the tension forces of the tension springs 15 so that the brake blocks 5 move inward and in opposite directions to clamp the brake disk 1 and to carry out operational braking. When the brake blocks 5 are forced against the brake disk 1 due to the added oil pressure, a positive pressure force is produced between the brake blocks 5 and disk 1, such positive pressure being in proportion to the oil pressure in the oil cylinder 14. The higher the oil pressure, the greater the braking torque. When the oil pressure is unloaded, the brake blocks 5 are separated from the brake disk 1 under the tension force of the tension springs 15 and the piston returns to its original relaxed position under the spiral spring force.

Figure 6:
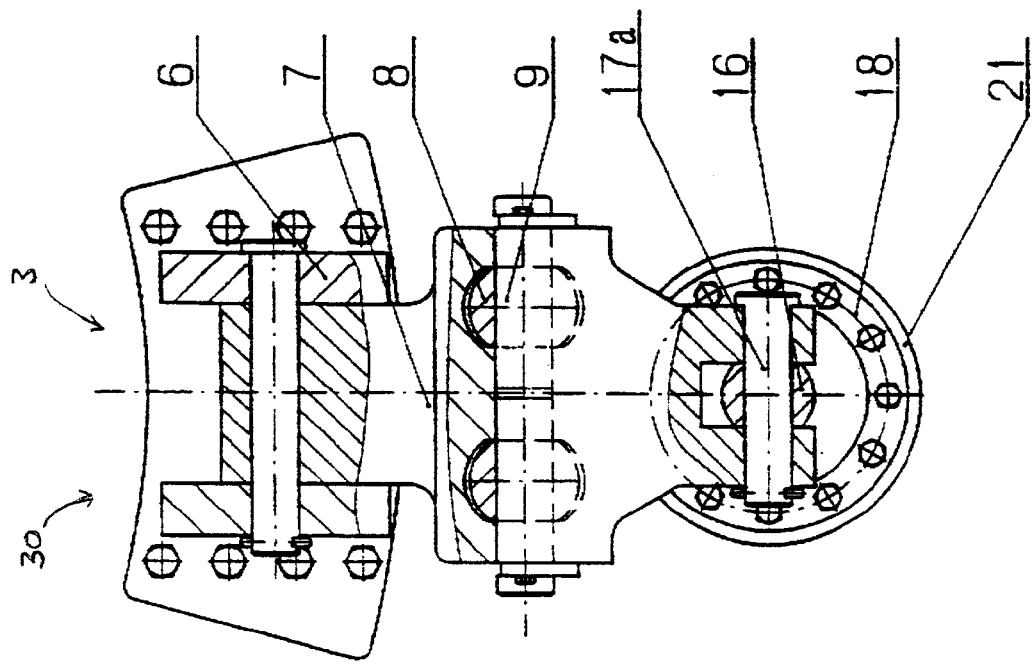
FIG. 6 is a side view of the emergency caliper depicted in FIG. 5.
Figure 5:
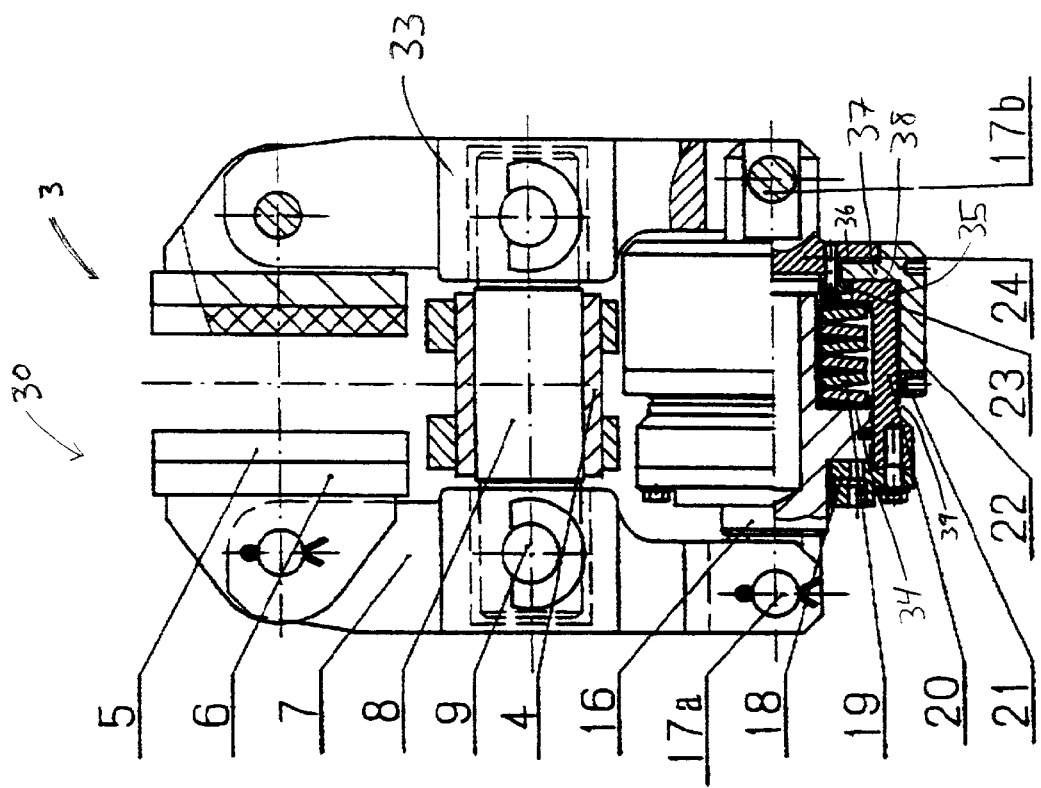
FIG. 5 is a front sectional view of the emergency caliper.

Now referring to FIGS. 5 and 6, the emergency caliper 3, like the service caliper 2, includes brake blocks 5 that are positioned proximate to the sides of the outside edges of the brake disk 1, the brake blocks 5 being fixed to the caliper body 6 and connected to one end of the lever 7. Supporting rod 8 is fixed to the caliper carrier 4. The two ends of the supporting rod 8 cooperate smoothly with the lever notch 33 in a radial direction through shaft pin 9. The lever 7 rotates on the shaft pin 9. The other ends of the two levers 7 are connected with piston rod 16 through shaft pin 17a and with top rod 24 through shaft pin 17b separately. The piston rod 16 is connected to a piston rod step 34 which is in turn connected to one end of disk spring group 19. The other end of the disk spring group 19 is connected with the bottom 35 of oil cylinder 20. An oil cylinder cap 18 is fixed to oil cylinder 20. The piston rod 16 cooperates smoothly with the oil cylinder 20. The step 36 of top rod 24 is inserted into the step 37 of adjustable nut 22 and fixed with spacer 23 on the bottom of the adjustable screw 38 tightly through the bolt. Blocking nut 21 and adjustable nut 22 are fixed through threaded connection to the outside edge 39 of oil cylinder 20. The adjustable nut 22 permits adjustment of the axis clearance between the top rod 24 and the oil cylinder 20, thereby permitting adjustment of the brake clearance of the emergency caliper. A blocking nut 21 then locks the adjustable nut 22 in position.

Unlike the service caliper 2, which is an oil feeding brake for operational braking, the emergency caliper 3 is an oil return brake. As with the service caliper 2, the piston rod 16 of the emergency caliper 3 moves relative to the oil cylinder 20 to cause the brake blocks 5 to apply braking forces against the brake disk 1 under the force of the levers 7. Before the addition of pressurized oil to the oil cylinder 20, the emergency caliper 3 is also relaxed. However, unlike the service caliper 2, the relaxed emergency caliper 3 pushes the brake blocks 5 against the brake disk 1 so that there is no clearance between the blocks 5 and disk 1.

In operation, pressurized oil is filled into the cavity of the oil cylinder 20 of the service caliper 3 via an oil inlet. The piston rod 16 moves with respect to the oil cylinder 20, using the piston rod step 34 to press against the tension forces of the disk spring 19 so that the levers 7 on both ends are pulled and the brake blocks 5 are pulled away from the brake disk 1, allowing the brake disk 1 to rotate freely. Brake clearance can be adjusted through the adjustable nut 22 to compensate the brake's wearing capacity. When the oil pressure is removed from the oil cylinder 20, the restoring tension force of the disk spring 19 pushes the brake blocks 5 through the levers 7 to clamp the brake disk 1, restoring the emergency caliper 3 to its relaxed state. Thus, unlike the service caliper 2, the emergency caliper 3 uses the force of the disk spring 19 to carry out its braking action.

The fact that the emergency caliper 3 provides braking action only in the absence of oil pressure and that this operational state is opposite to the operational state of the service caliper 2 makes the emergency caliper 3 appropriately used for emergency and parking braking. The contrary operating states of the operational and emergency calipers 2 and 3 also permits for the construction of a compound braking system using an interactive dual braking structure. The actual relative number of service or emergency calipers used is determined by the specific braking needs of a particular application.

The combined levers 7 have a "cross-type" structure. The two ends of the supporting rod 8 are put into the notch in the middle of the lever 7 so that the rod 8 can move flexibly and be easily installed or dismantled. Such a configuration allows the apparatus to incorporate fewer components and less structural material without unduly sacrificing overall strength. The configuration also helps to protect contacting surfaces of the supporting rod 8, lever 7 and the shaft pin 9 and to reduce corrosion. It has a clean appearance and is relatively simple to use.

The invention is also inherently well-suited for meeting the needs of normal operational braking and emergency braking. The design has great capacity of braking torque and stable braking effect with low braking inertia due to the inclusion of multiple braking calipers. Further, the design permits braking effort to be easily adjusted with easy operation and maintenance.

What is claimed is:

1. A liquid controlled disk braking device for a winch roller comprising:

a substantially circular rotating brake disk for positioning on the winch roller;

a caliper carrier positioned adjacent said brake disk, said caliper carrier disposing at least one fluid-operated service caliper and at least one fluid-operated emergency caliper, each said at least one service caliper and each said at least one emergency caliper having an oil inlet and an oil cylinder, each oil cylinder being responsive to fluid pressure introduced into each said oil cylinder through its respective oil inlet, each said oil cylinder and each said caliper having non-relaxed and relaxed conditions, said oil cylinders and said calipers assuming non-relaxed conditions when fluid pressure is introduced into said cylinders and assuming relaxed conditions when fluid pressure is removed from said cylinders;

each said at least one service caliper being positioned proximate said brake disk and configured to effect braking against said brake disk when said at least one service caliper is in the non-relaxed position of said service caliper, each said at least one service caliper being further configured to permit free rotation of said brake disk when said service caliper is in the relaxed position of said service caliper; and each said at least one emergency caliper being positioned proximate said brake disk and configured to effect braking against said brake disk when said at least one emergency caliper is in the relaxed position of each said emergency caliper; each said at least one emergency caliper being further configured to permit free rotation of said brake disk when said at least one emergency caliper is in the non-relaxed position of the at least one emergency caliper.

2. The liquid controlled disk braking device of claim 1 further comprising:

a plurality of supporting rods extending transversely along said caliper carrier, each of said supporting rods having one of said at least one service caliper and said at least one emergency caliper mounted thereon.

3. A liquid controlled disk braking device for a winch roller comprising:

a substantially circular rotating brake disk for positioning on the winch roller, said brake disk having two major surfaces;

a caliper carrier positioned adjacent said brake disk, said caliper carrier disposing at least one fluid-operated service caliper and at least one fluid-operated emergency caliper, each said at least one service caliper and each said at least one emergency caliper having an oil inlet and an oil cylinder, each oil cylinder being responsive to fluid pressure introduced into each said oil cylinder through its respective oil inlet, each oil cylinder and each caliper having non-relaxed and relaxed conditions, said oil cylinders and said calipers assuming non-relaxed conditions when fluid pressure is introduced into said cylinders and assuming relaxed conditions when fluid pressure is removed from said cylinders;

each said at least one service caliper disposing two service brake blocks, each of said service brake blocks positioned adjacent one respective major surface of said brake disk so that a spacial clearance exists between each of said brake blocks and its adjacent major surface when said at least one service caliper is in the relaxed position of said service caliper, each of said service brake blocks also being positioned so that no spacial clearance exists between each said service brake block and said service brake block's adjacent major surface when said at least one service caliper is in the non-relaxed position of said at least one service caliper, thereby effecting operational braking of said brake disk; and each said at least one emergency caliper disposing two emergency brake blocks, each of said emergency brake blocks being positioned adjacent one oft he major surfaces of said brake disk so that a spacial clearance exists between each said emergency brake block and the adjacent major surface of said emergency brake block when said at least one emergency caliper is in the non-relaxed position of said at least one emergency caliper, each of said emergency brake blocks also being positioned so that no spacial clearance exists between each emergency brake block and the adjacent major surface of each emergency brake block when said at least one emergency caliper is in the relaxed position of said at least one emergency caliper, thereby effecting tensional braking of said brake disk.

4. The liquid controlled disk braking device of claim 3 further comprising:

a plurality of supporting rods extending transversely along said caliper carrier, each of said supporting rods having one of said at least one service caliper and said at least one emergency caliper mounted thereon.

5. The liquid controlled disk braking device of claim 4 further comprising:

at least two shaft pins mounted on each of said supporting rods;

each said at least one service caliper and each said at least one emergency caliper having at least one lever mounted to rotate on each of said shaft pins, each of said levers having a lever notch for cooperating smoothly in a radial direction with its respective supporting rod, each said lever of said at least one emergency caliper positioned to pivotally interconnect said emergency brake blocks with said oil cylinder of said at least one emergency caliper so that said oil cylinder of said at least one emergency caliper and said emergency brake blocks cooperate in reciprocal motion, each said lever of said at least one service caliper positioned to pivotally interconnect said service brake blocks with said oil cylinder of said at least one service caliper so that said oil cylinder of said at least one service caliper and said service brake blocks cooperate in reciprocal motion.

6. The liquid controlled disk braking device of claim 5 in which each said at least one service caliper further comprises:

a piston rod for cooperating with said oil cylinder of said service caliper when said oil cylinder of said service caliper shifts between relaxed and non-relaxed conditions;

a first shaft pin and a second shaft pin, said first shaft pin positioned to interconnect said piston rod with a first of said levers, said second piston rod positioned to interconnect said oil cylinder of said service caliper with a second of said levers; and a first tension spring and a second tension spring, said first tension spring and said second tension spring each independently extending between said first shaft pin and said second shaft pin in order to prove tensional force against said piston rod when said oil cylinder of said service caliper shifts from relaxed to non-relaxed conditions.

7. The liquid controlled disk braking device of claim 5 in which each said at least one emergency caliper further comprises:

a piston rod having a piston rod step for cooperating with said oil cylinder of said emergency caliper when said oil cylinder of said emergency caliper shifts between relaxed and non-relaxed conditions;

a first shaft pin and a second shaft pin, said first shaft pin positioned to interconnect said piston rod with a first of said levers, said second shaft pin positioned to interconnect said oil cylinder of said emergency caliper with a second of said levers; and a disk spring group positioned between said piston rod step and said oil cylinder of said emergency caliper for providing tensional force against said piston rod when said oil cylinder of said emergency caliper shifts from relaxed to non-relaxed conditions.

8. The liquid controlled disk braking device of claim 7 in which each said at least one emergency caliper further comprises:
- a threaded connection on said oil cylinder of said emergency caliper disposing an adjustable nut, said adjustable nut being configured to permit manual adjustment of compression of said disk spring group for alterably setting spacial clearance between said emergency brake blocks and said brake disk when said oil cylinder of said emergency caliper and said at least one emergency caliper are in non-relaxed conditions.

9. The liquid controlled disk braking device of claim 5 wherein:
- said at least one service caliper and said at least one emergency caliper each further comprise a piston rod;
- said piston rod of said service caliper cooperating with said oil cylinder of said service caliper when said oil cylinder of said service caliper shifts between relaxed and non-relaxed conditions, a first shaft pin of said service caliper and a second shaft pin of said service caliper, said first shaft pin of said service caliper positioned to interconnect said piston rod of said service caliper with a first of said levers, said piston rod of said service caliper positioned to interconnect said oil cylinder of said service caliper with a second of said levers;
- said at least one service caliper further comprises a first tension spring and a second tension spring, said first tension spring and said second tension spring each independently extending between said first shaft pin of said service caliper and second shaft pin of said service caliper in order to provide tensional force against said piston rod of said service caliper when said oil cylinder of said service caliper shifts from relaxed to non-relaxed conditions,
- said piston rod of said emergency caliper cooperating with said oil cylinder of said emergency caliper when said oil cylinder of said emergency caliper shifts between relaxed and non-relaxed conditions, a first shaft pin of said emergency caliper and a second shaft pin of said emergency caliper, said first shaft pin of said emergency caliper positioned to interconnect said piston rod of said emergency caliper with a first of said levers, said piston rod of said emergency caliper positioned to interconnect said oil cylinder of said emergency caliper with a second of said levers; and
- said at least one emergency caliper further comprises a piston rod step on said piston rod of said emergency caliper and a disk spring group positioned between said piston rod step and said oil cylinder of said at least one emergency caliper for providing tensional force against said piston rod of said emergency caliper when said oil cylinder of said emergency caliper shifts from relaxed to non-relaxed conditions.

* * * * *